US008612957B2

(12) United States Patent  (10) Patent No.: US 8,612,957 B2
Guo et al.  (45) Date of Patent: Dec. 17, 2013

(54) SCHEDULING MULTITHREADED PROGRAMMING INSTRUCTIONS BASED ON DEPENDENCY GRAPH (75) Inventors: Xiaofeng Guo, Shanghai (CN); Jinquan Dai, Shanghai (CN); Long Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 2041 days.

(21) Appl. No.: 10/582,204

(22) PCT Filed: Jan. 26, 2006

(86) PCT No.: PCT/CN2006/000162
§ 371 (c)(1),
(2), (4) Date: Jun. 8, 2006

(87) PCT Pub. No.: WO2007/085121
PCT Pub. Date: Aug. 2, 2007

(65) Prior Publication Data
US 2009/0043991 A1  Feb. 12, 2009

(51) Int. Cl.
G06F 9/45  (2006.01)
(52) U.S. Cl.
USPC ............................ 717/161; 717/153; 717/156
(58) Field of Classification Search
None
See application file for complete search history.

(56) References Cited
U.S. PATENT DOCUMENTS 5,107,418 A * 4/1992 Cramer et al. ................ 717/155
5,202,993 A * 4/1993 Tarsy et al. ................... 717/152
5,303,377 A * 4/1994 Gupta et al. .................. 717/155
5,557,761 A * 9/1996 Chan et al. .................... 717/156
5,689,711 A * 11/1997 Bardasz et al. ............... 717/105
5,712,791 A * 1/1998 Lauterbach ....................... 716/4
5,867,711 A   2/1999 Subramanian et al.
6,038,396 A * 3/2000 Iwata et al. .................... 717/161
6,044,222 A * 3/2000 Simons et al. ................ 717/156
6,064,819 A * 5/2000 Franssen et al. .............. 717/156
6,173,444 B1 * 1/2001 Archambault ................ 717/159
6,243,864 B1 * 6/2001 Odani et al. .................. 717/154
6,305,014 B1 * 10/2001 Roediger et al. ............. 717/154
6,611,956 B1 * 8/2003 Ogawa et al. ................. 717/152
6,651,246 B1 * 11/2003 Archambault et al. ....... 717/160
6,654,952 B1 * 11/2003 Nair et al. ..................... 717/157
6,675,380 B1 * 1/2004 McKinsey et al. ........... 717/161
6,820,223 B2 * 11/2004 Heishi et al. .................... 714/38

(Continued)

FOREIGN PATENT DOCUMENTS

CN 1670699 9/2005

OTHER PUBLICATIONS

Chris Jesshope, Scalable Instruction—Level Parallelism, published by Springer—Verlag Berlin Heidelberg 2004, pp. 383-392.*

(Continued)

*Primary Examiner* — Tuan Q. Dam
*Assistant Examiner* — Zheng Wei
(74) *Attorney, Agent, or Firm* — Trop, Pruner & Hu, P.C.

(57) ABSTRACT

A computer implemented method for scheduling multi-threaded programming instructions based on the dependency graph wherein the dependency graph organizes the programming instruction logically based on blocks, nodes, and super blocks and wherein the programming instructions could be executed outside of a critical section may be executed outside of the critical section by inserting dependency relationship in the dependency graph.

18 Claims, 9 Drawing Sheets

(56) References Cited

U.S. PATENT DOCUMENTS

| | | | |
|---|---|---|---|
| 6,918,111 B1 * | 7/2005 | Damron et al. | 717/161 |
| 7,197,747 B2 * | 3/2007 | Ishizaki et al. | 717/146 |
| 7,386,844 B2 * | 6/2008 | Heishi et al. | 717/161 |
| 7,448,031 B2 * | 11/2008 | Wu | 717/161 |
| 7,617,495 B2 * | 11/2009 | Muthukumar et al. | 717/161 |
| 7,904,892 B2 * | 3/2011 | Babb et al. | 717/144 |
| 8,250,557 B2 * | 8/2012 | Mitran et al. | 717/161 |
| 8,453,131 B2 * | 5/2013 | Li et al. | 717/149 |
| 2002/0013937 A1 | 1/2002 | Ostanevich et al. | |
| 2002/0095666 A1 * | 7/2002 | Tabata et al. | 717/149 |
| 2003/0074654 A1 * | 4/2003 | Goodwin et al. | 717/161 |
| 2004/0025152 A1 * | 2/2004 | Ishizaki et al. | 717/159 |
| 2004/0025153 A1 * | 2/2004 | Johnson et al. | 717/161 |
| 2004/0083468 A1 * | 4/2004 | Ogawa et al. | 717/151 |
| 2004/0133886 A1 * | 7/2004 | Wu | 717/154 |
| 2005/0108695 A1 * | 5/2005 | Li et al. | 717/144 |
| 2005/0216900 A1 * | 9/2005 | Shi et al. | 717/161 |
| 2005/0257221 A1 * | 11/2005 | Inchingolo et al. | 718/100 |
| 2006/0048124 A1 * | 3/2006 | Martin | 717/160 |
| 2007/0162903 A1 * | 7/2007 | Babb et al. | 717/154 |
| 2009/0049433 A1 * | 2/2009 | Li et al. | 717/149 |
| 2009/0113396 A1 * | 4/2009 | Rosen et al. | 717/127 |

OTHER PUBLICATIONS

Int'l application No. PCT/US2006/000162 Filed Jan. 26, 2006; Int'l Search Report & Written Opinion dated Dec. 18, 2006.

Notification Concerning Transmittal of International Preliminary Report on Patentability, Mailed Aug. 7, 2008, PCT/CN2006/00162, 5 pages.

* cited by examiner

SCHEDULING MULTITHREADED PROGRAMMING INSTRUCTIONS BASED ON DEPENDENCY GRAPH

CROSS-REFERENCE TO RELATED APPLICATION

This application is a National Phase application of, and claims priority to, International Application No. PCT/CN2006/000162, filed Jan. 26, 2006, entitled SCHEDULING MULTITHREADED PROGRAMMING INSTRUCTIONS BASED ON DEPENDENCY GRAPH

TECHNICAL FIELD

Embodiments of the present invention relate to scheduling the execution of a sequence of programming instructions based on a dependency graph.

BACKGROUND

Multithreading and multiprocessing are common programming techniques often used to maximize the efficiency of computer programs by providing a tool to permit concurrency or multitasking. Threads are ways for a computer program to be divided into multiple and distinct sequences of programming instructions where each sequence is treated as a single task and to be processed simultaneously. An application that may use the multithreaded programming technique is a packet-switched network application that processes network packets in a high speed packet-switched system concurrently.

To maintain and organize the different packets, a new thread may be created for each incoming packet. In a single processor environment, the processor may divide its time between different threads. In a multiprocessor environment, different threads may be processed on different processors. For example, the Intel™ IXA network processors (IXPs) have multiple microengines (MEs) processing network packets in parallel where each ME supports multiple threads.

The network performance in processing these packets depends on the time it requires to process a packet; the faster a packet can be processed the more efficient a switch is. The service time of a switch usually refers to the time between the arrival and the departure of a packet. When a packet arrives, a series of tasks such as the receipt of the packet, routing table look-up, and queuing can be performed by the new thread to service the packet. Resource access latency usually refers to the time delay between the instant when resource access such as memory access is initiated, and the instant when the accessed data in the resource is effective. For example, the time it takes to perform a routing table look-up is resource access latency. In many instances, the resource access latency in processing a packet takes up the majority of the service time.

In a multithread environment, a processor that is usually idle during resource access latency may be used to execute a different thread. The time the processor executes the different thread overlaps the time the processor executes the previous thread usually refers to as resource access latency overlapping or resource access latency hiding. Multiple threads may access the same resource concurrently if one thread does not depend on another thread. The following example demonstrates a dependency relationship between two instructions and resource access latency overlapping and hiding.

Figure 1A:
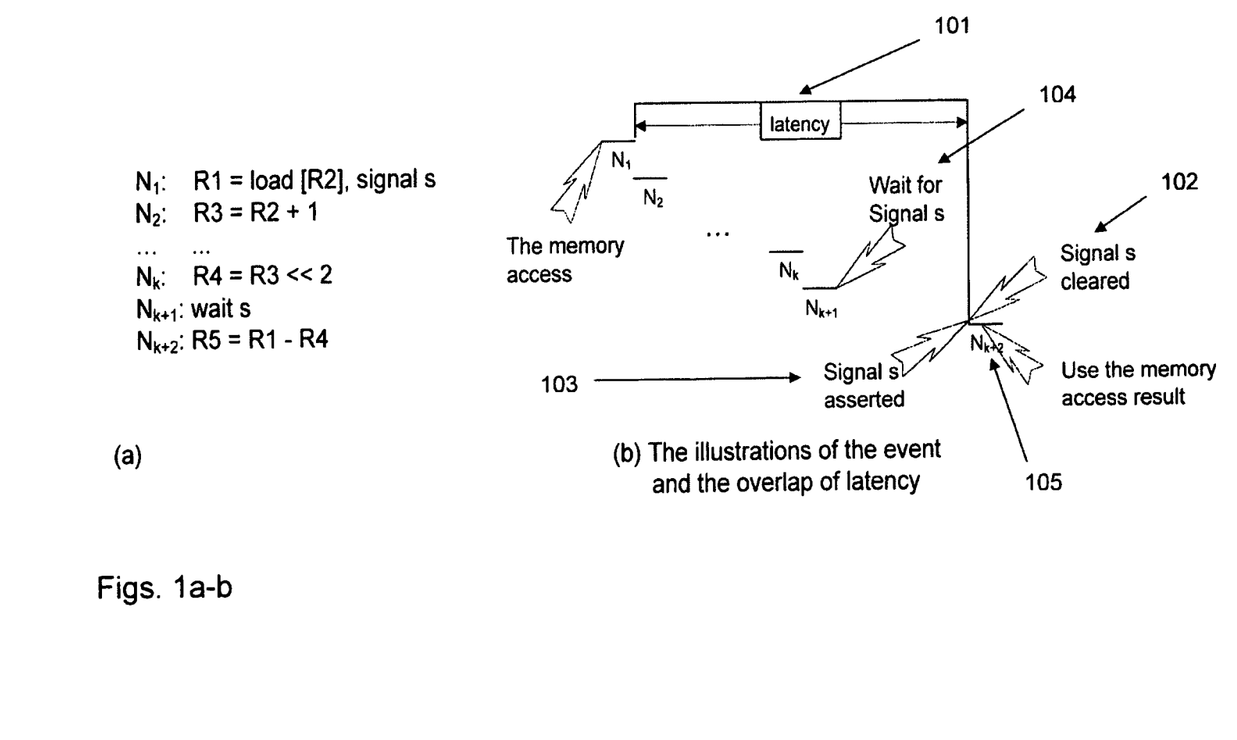
FIG. 1a depicts an example of a sequence of programming instructions.

FIG. 1a depicts a sequence of programming instructions $N_1$ to $N_{k+2}$. Instruction $N_1$ loads the data, stores in memory location R2, into memory or register R1. After R1 is loaded with the data from memory location R2, instruction $N_1$ asserts a signal s. Instructions $N_2$ through $N_k$ are independent from $N_1$ because these instructions do not need the data from R1. Thus, they may be processed concurrently while $N_1$ accesses the data from memory location R2.

The duration in which $N_1$ loads the data may be referred to as the resource access latency 101. FIG. 1b is a diagram illustrating the execution of overlapping instructions. In this diagram, instruction $N_1$ loads a data from memory location R2 into a register or memory R1 and sends signal s after the data is loaded. Concurrently, $N_2$ through $N_k$ are executed while $N_1$ is executed. Instruction $N_{k+2}$ depends from $N_1$ because $N_{k+2}$ needs the data from memory or register R1. Consequently, instruction $N_{k+1}$ waits 104 for the signal s from instruction $N_1$ and blocks all the subsequent executions until the wait instruction is satisfied when the signal s is detected. Because instruction $N_1$ only asserts a signal s when the instruction finishes loading the data from memory location R2 at 103, $N_{k+2}$ is not executed until the signal s is cleared at 102. Subsequently, instruction $N_{k+21}$ uses R1 in its execution at 105.

The instructions listed in FIG. 1a may be run in a multi-threaded environment where each thread handles one instruction. In such scenario, threads communicate to other threads through shared resources such as global memory, registers, or signals. For example, signal s, and registers R1 ... R5 are the shared resources and are accessible by instructions $N_1$ ... $N_{k+2}$. In many instances, the shared recourse may only be accessed by one thread, for example, until instruction $N_1$ asserts a signal s, no instructions may be executed before instruction $N_{k+2}$. This duration usually refers to a critical section because instructions are executed in a mutually exclusive manner. A critical section may also be defined in terms of a program where a computer programmer marks a part of the program as the critical section. For example, a critical section may begin before instruction $N_{k+1}$, when it waits for signal s, and ends after the assertion of signal s.

Figure 2:
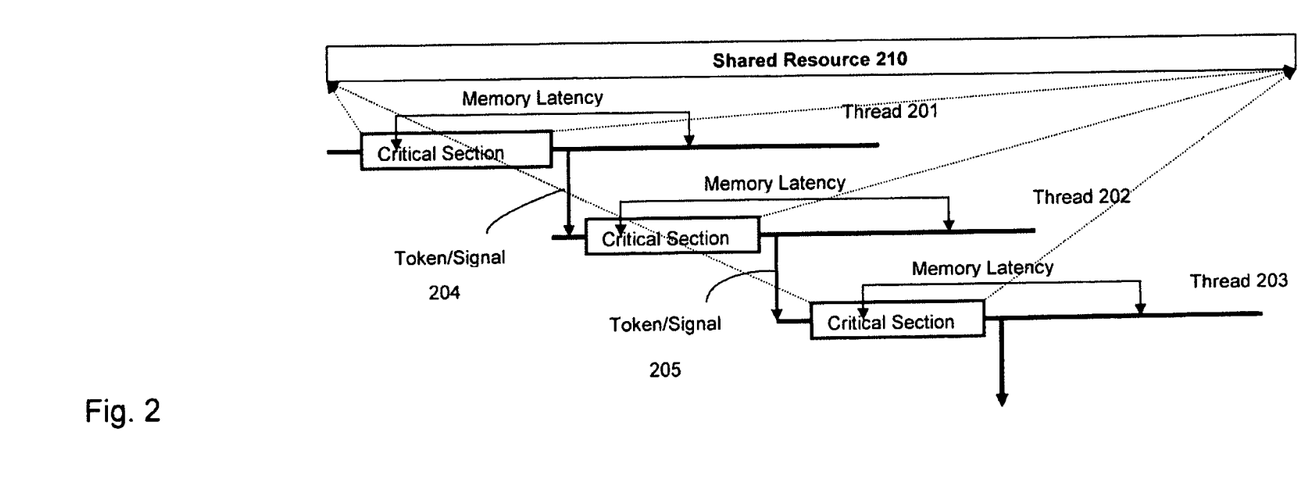
FIG. 2 illustrates an example of token or signal based critical sections.

A conventional method to implement a critical section is to use an entry and an exit protocol. For example, a token or a signal may be used to permit the entering or to indicate the exiting of a critical section. An example of the token or signal based critical section is illustrated in FIG. 2 where a thread 202 waits for a token or signal 204 from a previous thread 201. After accessing its critical section, the thread 202 then passes another token or signal 205 to a thread 203. Before the thread 203 receives the token or signal 205, the thread 202 has exclusive access to a shared resource 210.

In a situation where an instruction blocks all subsequent executions, such as the wait instruction $N_{k+1}$ in FIG. 1a, is included in a critical section, the critical section becomes longer than it is necessary. The critical section is longer because the wait instruction already blocks all the subsequent executions, a critical section may not be needed to ensure the exclusivity in accessing a shared resource.

CONTENTS OF THE INVENTION

A network processor may be idle during the time a network packet accesses a shared resource such as a memory. The performance of a network processor can be improved if it can process a second network packet while the first packet accesses the shared resource. When the network processor processes multiple network packets, the access latency overlaps or hidden. Therefore, the problem is how to overlap or hide the latency to optimize the network performance.

One embodiment of the invention includes a method to optimize a computer program that processes the network packets by designing the computer program in a multi-threaded environment and overlapping the resource access latency between different threads.

One embodiment of the invention organizes the computer program into a plurality of blocks, determines a critical section of the computer program, constructs a dependency graph, recognizes a portion of the computer program that could be executed outside of the critical section, and inserts a plurality of dependency relationships between the plurality of blocks to cause execution of the recognized portion of the computer program outside of the critical section.

The advantage of the embodied solutions is that threads may enter the critical section sooner than the computer program has originally designed and therefore improves the performance of the network.

BRIEF DESCRIPTION OF THE FIGURES

Various embodiments are illustrated by way of example and not by way of limitation in the figures of the accompanying drawings in which like references indicate similar elements. It should be noted that references to "an," "one," or "various" embodiments in this disclosure are not necessarily to the same embodiment, and such references mean at least one.

FIG. 1b illustrates an example of resource access latency overlapping based on the sequence of programming instructions listed in FIG. 1a.

FIG. 6b is a dependency graph illustrating a sequence of programming instruction after rescheduling the instructions in accordance to one embodiment of the invention.

DETAILED DESCRIPTIONS

A method for scheduling multithreaded programming instructions based on a dependency graph is described below.

A person of ordinary skill in the pertinent art, upon reading the present disclosure, will recognize that various novel aspects and features of the present invention can implemented independently or in any suitable combination, and further, that the disclosed embodiments are merely illustrative and not meant to be limiting.

Figure 3A:
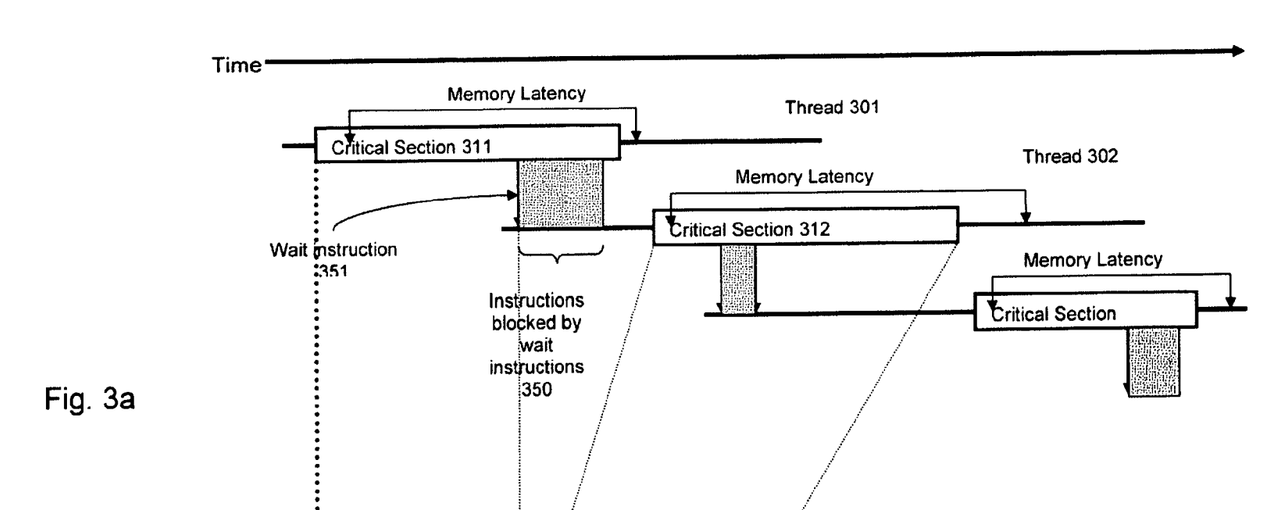
FIG. 3 illustrates an example of moving instructions outside of a critical section to shorten the critical section according to one embodiment of the invention.

FIG. 3 illustrates an example of moving instructions outside of a critical section to shorten the critical section according to one embodiment of the invention. In a token or signal based critical section described above, thread 302 may wait until thread 301 exits a critical section 311 before thread 302 may begin to execute its instructions in a critical section 312. A shaded block 350 represents the instructions blocked by a wait instruction 351. Since the wait instruction 351 already blocks all the subsequent instructions in 350, the instructions in 350 may be moved outside of the critical section 311 and not affecting the sequence in which the instructions may be executed.

Figure 3B:
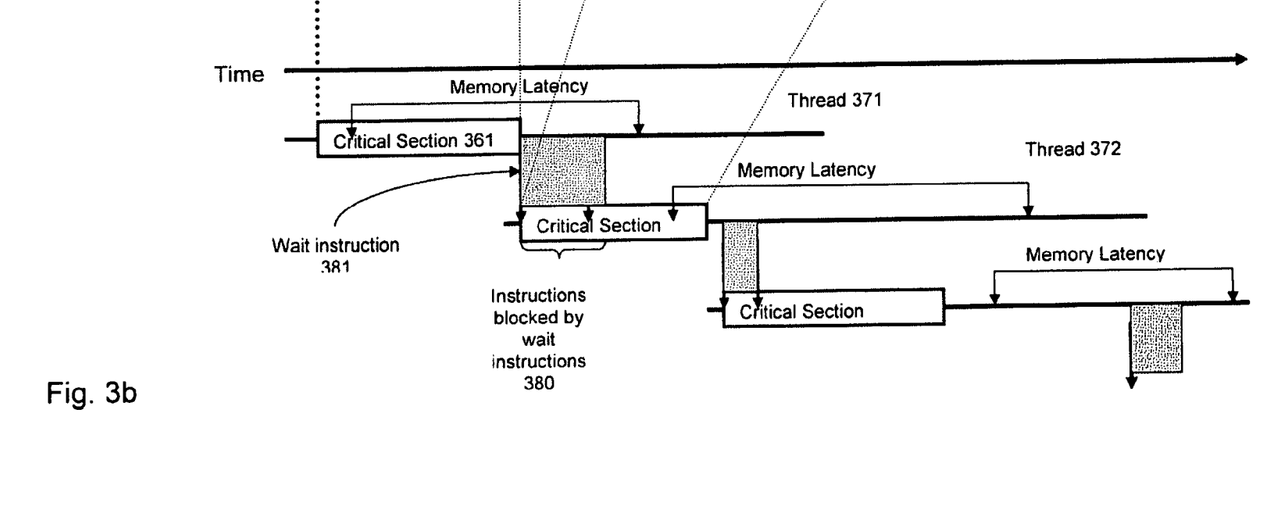

When the wait instruction 351 is moved outside of the critical section 311, the critical section 311 may be shortened. As depicted in FIG. 3b, a critical section 361 is shorter than the critical section 311 depicted in FIG. 3a. As a result, thread 371 may release the critical section 361 to thread 372 sooner than thread 301 releases the critical section 311 to thread 302. In this embodiment of the invention, the wait instruction 351 is moved to a location indicated by 381 and the instructions blocked by the wait instructions, 350, are moved to a location indicated by 380. When critical sections are shortened as much as they may be shortened, a multithreaded program may be executed efficiently.

Figure 4:
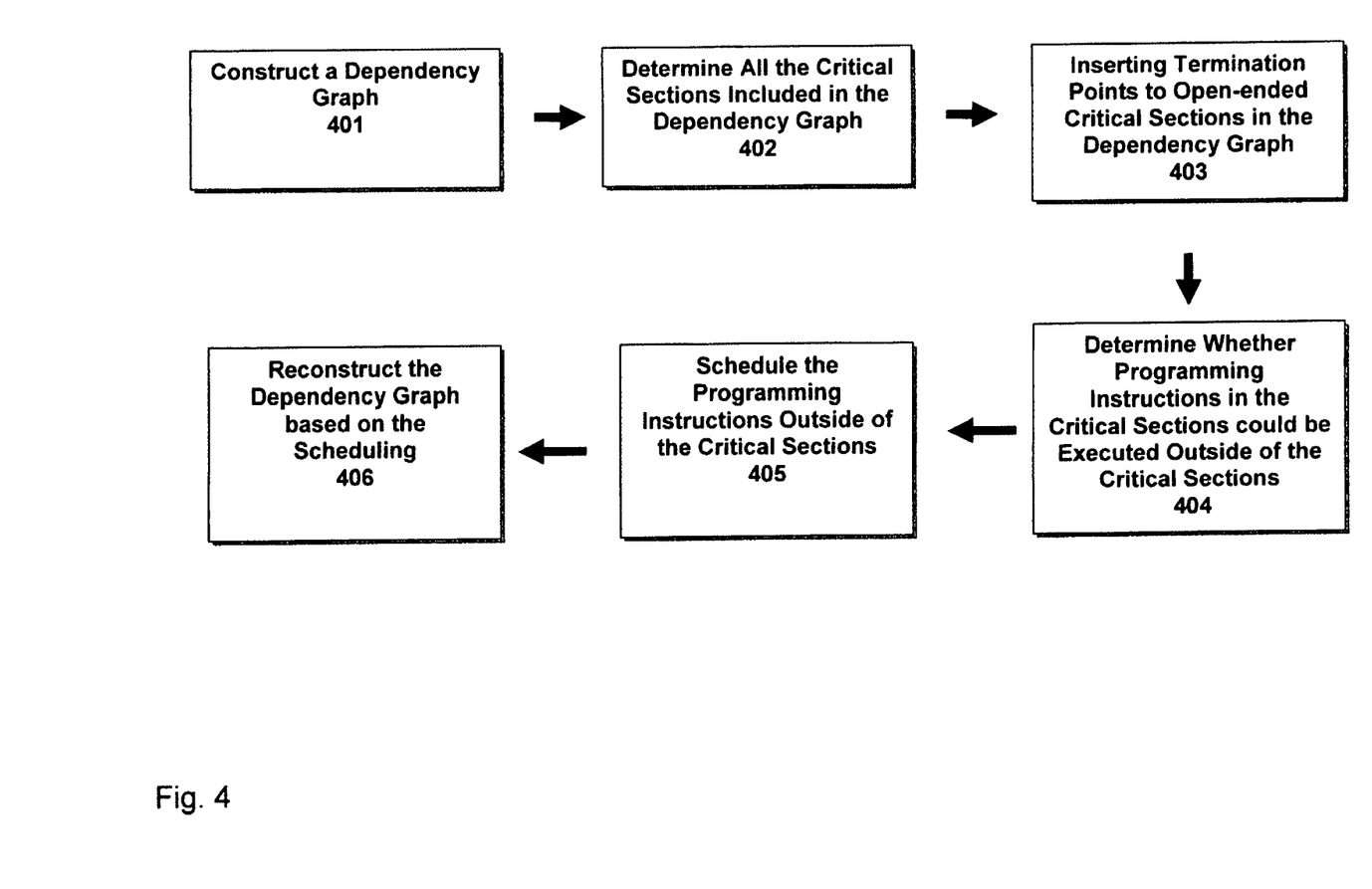
FIG. 4 is a flow chart describing the key operations in accordance to one embodiment of the invention.

FIG. 4 is a generalized flow chart describing the key operations in accordance to one embodiment of the invention. Operation 401 constructs a dependency graph based on blocks, nodes, and super blocks. In one embodiment of the invention, the dependency graph is a logical representation of the programming instructions where programming instructions may be organized logically into blocks, nodes, and super blocks, which will be discussed in details below.

Operation 402 determines all the critical sections included in the dependency graph. A dependency graph may represent the entire programming instructions or it may represent a portion of the programming instructions. If a dependency graph represents the entire programming instructions, the dependency graph may include all the critical sections. On the contrary, if a dependency graph represents a partial programming instructions, its logical organization may include a portion of the critical sections. In one embodiment of the invention, a critical section may begin before entering the partial programming instructions represented by the dependency graph and end before exiting the partial programming instructions. In another embodiment of the invention, a critical section may begin after entering the partial programming instructions and end subsequent to exiting the partial programming instructions.

In one embodiment of the invention, a partial programming instruction is treated as a complete program. Therefore, an open-ended critical section may not be processed correctly. Termination points may be added to the dependence graph to ensure the completeness of the program (operation 403).

Operation 404 determines whether the programming instructions in the critical sections could be executed outside of the critical sections. If so, operation 405 schedules these programming instructions outside of the critical sections by inserting dependency relationships to ensure these instructions are not executed during the critical sections. After rescheduling, in operation 406, a reconstructed dependency graph is formed.

Figure 5A:
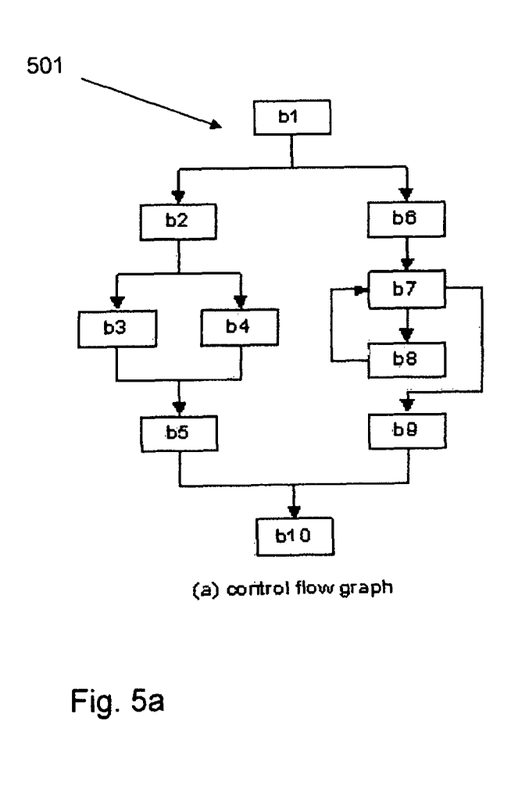
FIG. 5a is a control flow chart depicting a sequence of programming instructions based on blocks.

FIG. 5a is a control flow graph depicting a plurality of blocks representing a grouping of a sequence of programming instructions. In 501, programming instructions are organized merely on the block level. In one embodiment of the invention, each block may include a sequence of programming instructions. In another embodiment of the invention, each block may include only a single instruction. For example, blocks b3 and b4 may include multiple programming instructions and block b2 may contain a single programming instruction.

The sequence of programming instructions may also be organized or grouped by methods other than blocks. In one embodiment of the invention, the programming instructions may be organized or grouped based on the different program constructs such as a single instruction, a conditional construct, or a loop construct. In this embodiment of the invention, such grouping may be referred to as the nodes. In another embodiment of the invention, the instructions may be organized or grouped based on nodes into super blocks.

Figure 5B:
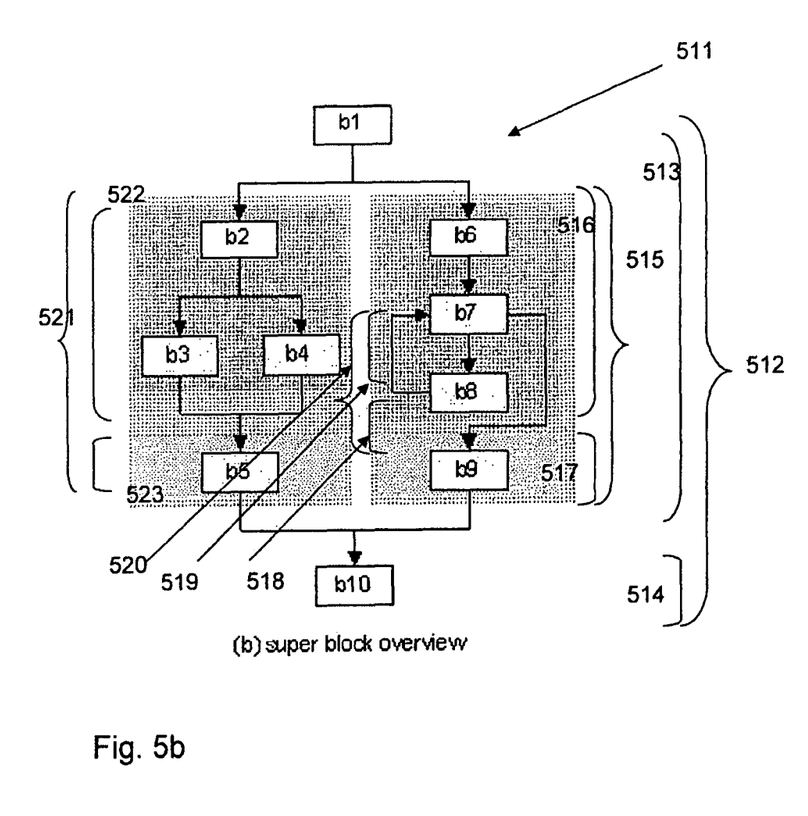
FIG. 5b is a control flow chart depicting a sequence of programming instructions with super block organization.

FIG. 5b is a control flow graph depicting a sequence of programming instructions with super block organization. In one embodiment of the invention, a super block may contain a sequence of nodes or blocks. In the figure, diagram 511 depicts a super block overview based on several conditional constructs and a loop construct. One of the conditional constructs includes block b2, b3, and b4 and another conditional construct includes block b1, b2, and b6. The loop construct includes block b7 and b8.

As discussed before, the programming instructions may also be organized by super blocks. As an example, the blocks in FIG. 5a may be organized in at least four different ways based on super blocks. The first super block, s1, would include node 513 and node 514. Node 513 includes block b1, b2, b3, b4, b5, b6, b7, b8, and b9, and node 514 includes block b10. Node 513 is a conditional construct and 514 may be a single instruction. The second example of the super block, 521, may include node 522 and node 523. Node 522 may include block b2, b3 and b4, and node 523 includes block b5. In this example, 522 is a conditional construct and 523 may be a single instruction.

The third example of the super block, 515, may include node 516 and node 517. Node 516 may include block b6, b7, and b8, and node 517 may include block b9. In this example, node 516 is a loop construct and 517 is a single instruction. The fourth example of the super block, 520, may include node 519 and node 518. Node 519 may include block b7 and node 518 may include block b8. In this example, node 519 and 518 are two single instructions.

Figure 6A:
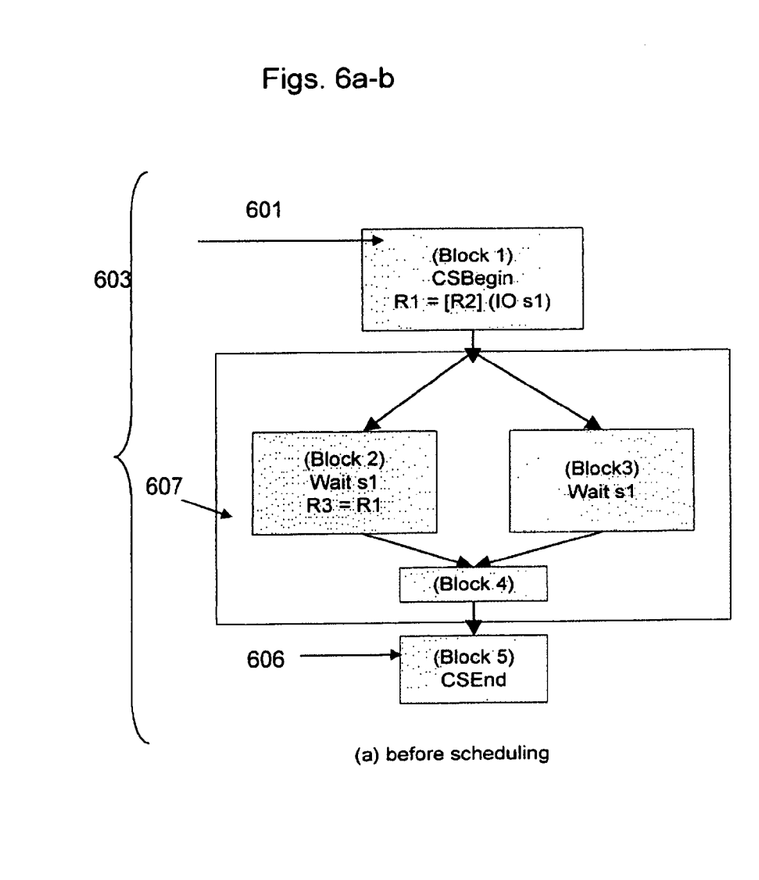
FIG. 6a is a dependency graph illustrating a sequence of programming instructions before rescheduling the instructions in accordance to one embodiment of the invention.

FIG. 6a is a dependency graph illustrating a sequence of programming instructions before scheduling in accordance to one embodiment of the invention. In a sequence of programming instructions such as:

b1: CSBegin; R1=[R2]; signal s1
b2: Wait s1; R3=R1
b3: Wait s1
b4: R5=R6
b5: CSEnd wherein CSBegin indicates the beginning of a critical section and CSEnd indicates the end of a critical section, a dependency graph such as the one depicted in FIG. 6a may be used to illustrate the sequence. In one embodiment of the invention, the dependency graph may be organized in blocks, nodes and super blocks. For example, node 1 may include block 1, node 2 may include blocks 2, 3, and 4, and node 3 may includes block 5 as shown in FIG. 6a as node 601, node 607, and node 606, respectively.

A super block 603, may include node 601, node 607, and node 606. In the above example of the programming instructions, blocks 3 and 4 are independent of block 1 because block 3 does nothing and block 4 can be executed independently from block 1. Although block 2 depends from block 1, so long block 2 is executed after block 1, block 2 will use the correct R1 because before block 2 can execute the instruction, R3=R1, b2 must wait for signal s1 from block 1.

Knowing the dependency relationships between each block enables the rescheduling of the programming instructions and the critical section is shortened. In return, a shortened critical section may permit other threads to access the critical section sooner than the programming instructions have originally planned. In one embodiment of the invention, block 5 at 606 may be moved in according to FIG. 6b. FIG. 6b is a dependency graph illustrating a sequence of programming instructions after scheduling the instructions where block 1 611 remains as the beginning of a critical section and super block 617 including blocks 2, 3 and 4 are moved subsequent to block 5 at 616. When the execution of the programming instructions based on the dependency graph illustrated in FIG. 6b, instructions may be executed in the order described by the dependency graph. In this example, the critical section ends at block 5 at 616. Other threads waiting to access the critical section may acquire access to the global memory at this time.

Figure 7:
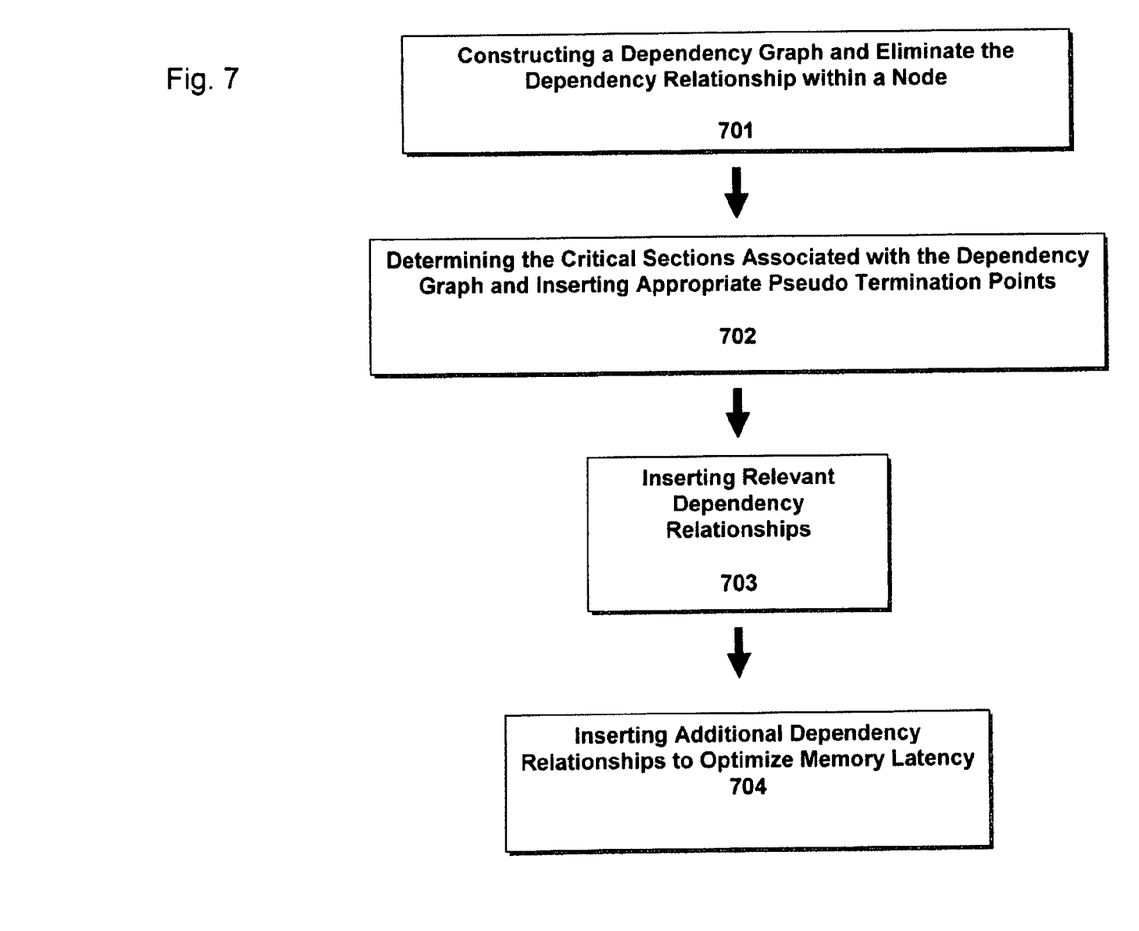
FIG. 7 is a rescheduled dependency graph illustrating a sequence of the programming instructions in accordance to one embodiment of the invention.
Figures 8A, 8B:
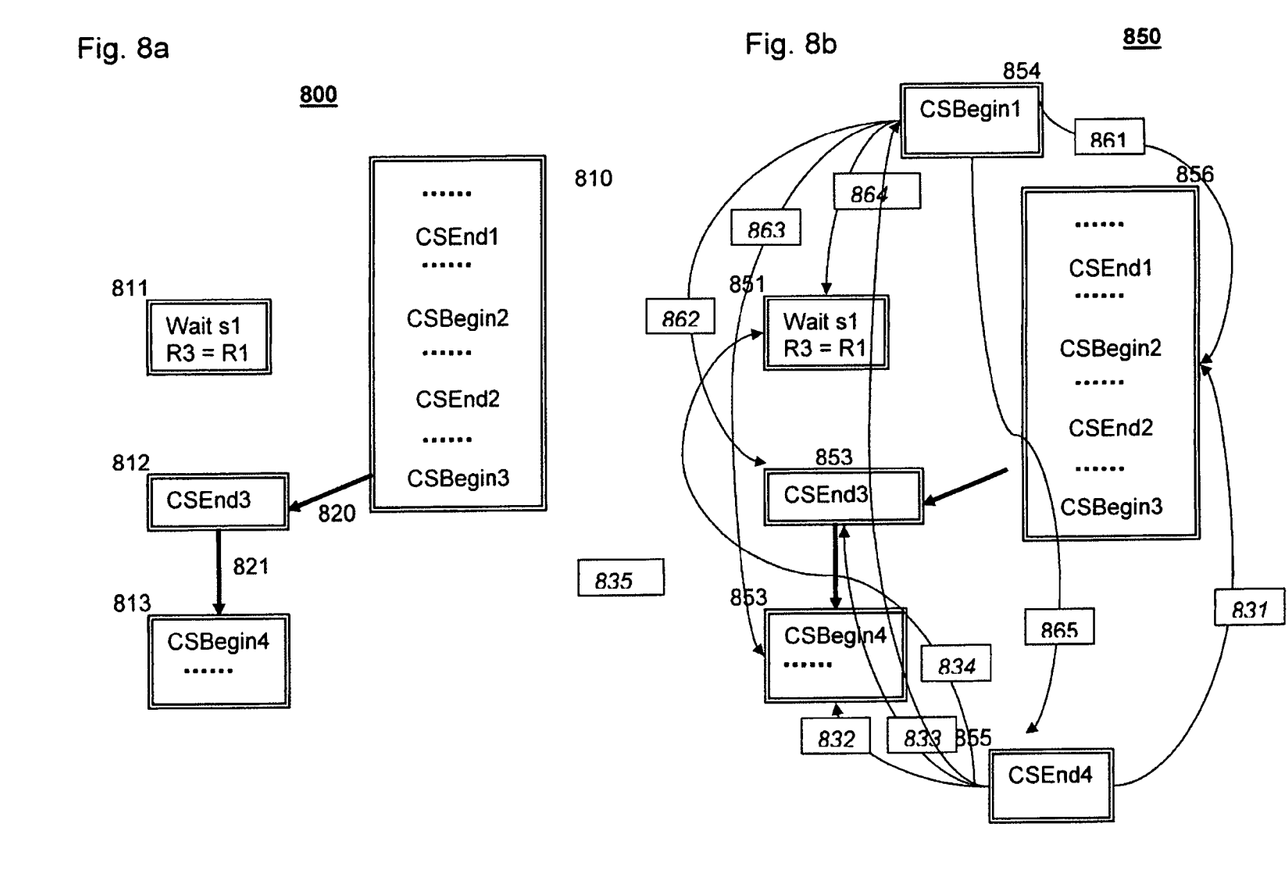
FIG. 8a is a block diagram illustrating a dependency graph before adding pseudo termination points and dependency relationships in accordance to on embodiment of the invention.
FIG. 8b is a block diagram illustrating a rescheduled dependency graph after adding pseudo termination points and dependency relationships in accordance to on embodiment of the invention.

FIGS. 7, and 8a-c are to be discussed concurrently. FIG. 7 is a flow chart describing the detailed operations in constructing an initial dependency graph and reconstructing the dependency graph. In operation 701, a dependency graph is constructed based on blocks, nodes, and super blocks. As discussed above, blocks may include a sequence of programming instructions, nodes may represent programming constructs, and super blocks may include a sequence of blocks. FIGS. 8a-b are used to illustrate the operations described in FIG. 7.

FIG. 8a is a diagram illustrating the initial dependency graph 800 subsequent to operation 701 based on an exemplary programming instructions. In one embodiment of the invention, node 810 may include partial programming instructions, a CSEnd1, a CSBegin2, a CSEnd2, and a CSBegin3. Node 811 may include a single instruction, wait s1. Node 812 may include a CSEnd3. And node 813 may include a CSBegin4. In addition, link 820 and 821 represent that node 810 may be executed before node 812 and node 12 before node 813.

In constructing the initial dependency graph 800, the dependency relationships between the programming instructions in a node are eliminated in operation 702. In one embodiment of the invention, a node may include multiple programming instructions but the node may be depicted in the dependency graph as a single block. For example, node 811 includes two programming instructions, namely, Wait s1 and R3=R1 but the node is illustrated in the initial dependency graph 800 as a single node, even though instruction R3=R1 depends from instruction wait s1. If a node includes only a single instruction, there is no dependency relationship and therefore, operation 702 may be skipped.

Subsequent to constructing the initial dependency graph 800 in operation 701, operation 702 determines the critical sections associated with the initial dependency graph 800 and inserts appropriate pseudo termination points. As discussed above, a dependency graph may represent the entire programming instructions or it may represent a portion of the programming instructions. If the dependency graph represents a partial programming instructions, its logical organization may include a portion of critical sections.

In one embodiment of the invention, if a critical section begins before entering the partial programming instructions and ends before exiting the partial programming instructions, a termination point may be inserted to the rescheduled dependency graph. This is depicted in FIG. 8a where node 810 includes a CSEnd1 but the dependency graph 800 does not include a CSBegin1. This indicates that critical section 1 begins prior to the entering of this portion of the programming instructions. In this embodiment of the invention, a termination point may be added to mark the beginning of the critical section. For example, in FIG. 8b, a pseudo CSBegin1 854 may be inserted in the rescheduled dependency graph 850.

In another embodiment of the invention, if the critical section begins after entering the partial programming instructions but ends subsequent to exiting of the partial programming instructions, a termination point may by inserted to the rescheduled dependency graph. This is depicted in FIG. 8a where node 813 includes a CSBegin4 but the dependency graph 800 does not include a CSEnd4. This indicates that critical section 4 begins after entering the partial programming instructions but ends subsequence to the exiting of the partial programming. In this embodiment of the invention, a termination point may be inserted signify an end to the critical section. For example, in FIG. 8b, a pseudo CSEnd4 855 may be inserted in the reconstructed dependency graph 850.

Subsequently, operation 703 inserts relevant dependency relationships between the blocks in the reconstructed dependency graph. In one embodiment of the invention, dependency relationships 861, 862, 863, 864, and 865 may be inserted to ensure that CSBegin1 854 is executed prior to all other nodes in this reconstructed dependency graph representation. Similarly, dependency relationships 831, 832, 833, 834, and 835 may be inserted to ensure that CSEnd4 855 is executed subsequent to all other nodes in this reconstructed dependency graph representation.

Figure 8C:
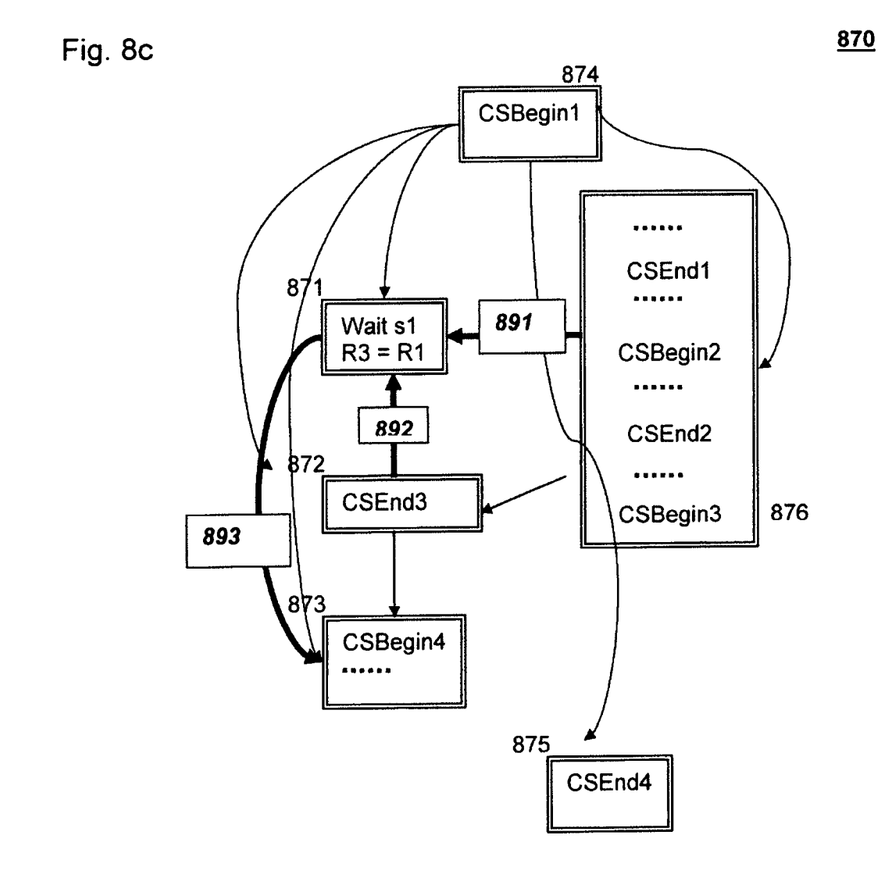
FIG. 8c is a block diagram illustrating a rescheduled dependency graph after adding additional dependency relationships in accordance to on embodiment of the invention.

Operation 704 inserts additional dependency relationships to optimize the efficiency during the memory latency. In one embodiment of the invention, three types of dependency relationship may be added to the reconstructed dependency graph 880. The first type may be referred as the direct dependency. FIG. 8c is a diagram illustrating a reconstructed dependency graph with additional dependency relationships. In FIG. 8c, direct dependency 891 may be added because node 871 directly depends from node 876. A direct dependency relationship is inserted if a node depends from a CSBegin or a CSEnd depends on the node. In this example, Node 871 depends from node 870 because wait s1 may be executed outside of the critical section 1. By inserting the dependency relationship 891, instructions in 871 may be executed after the CSEnd1 in node 876 is executed. Consequently, instructions in 871 are scheduled out of the critical section 1 and therefore, shorten the critical section 1.

The second type of dependency relationship may be referred to as the indirect dependency. In FIG. 8c, the indirect dependency relationship 892 is inserted between node 872 and node 871. This type of dependency relationship may be inserted if a node may be scheduled out of other critical sections. In this example, node 872 is independent of critical section 2 or 3, therefore, node 872 may be scheduled to be executed after these two critical sections have run. By inserting an indirect dependency relationship from node 872 to node 871, the reconstructed dependency graph 870 describes that node 872 may be executed before node 871 is executed. This ensures that the durations of the critical section 2 and 3 are again, shortened.

The third type of dependency relationship may be referred to as the shortest lifetime dependency. In FIG. 8c, the shortest lifetime dependency relationship 893 is inserted from node 871 to node 873. This type of dependency relationship functions like a stopper and it may be inserted to the reconstructed dependency graph 870 to stop a moving node after it has been scheduled outside of the critical sections. In this example, after node 871 has been successfully scheduled outside of the critical sections 2 and 3, the shorted lifetime dependency relationship 893 ensures that node 871 is executed before the end of the reconstructed dependency graph.

An example of a pseudo code according to an embodiment of the invention in which the method to construct an additional dependency graph may be implemented is provided below.

---

```
constructing initial dependency graph, DG;
    // containing super block, nodes, and blocks
constructing initial transitive closure of DG, H and the inverse, Hinv
inserting pseudo CSBegin and CSEnd in the super block
do {
    changed = false;
    for each node n in the super block
        for each (CSBegin, CSEnd) in the super block
        {
            if (e ∈ H[n] && !n ∈ H[b] && !b ∈ H[n])
            {
                changed = true;
                add (n->b) into DG;
                ∀ x ∈{b}∪ H[b], Hinv[x] |= {n}∪ Hinv[n];
                ∀ x ∈{n}∪ Hinv[n], H[x] |= {b}∪ H[b];
            }
            else if (n ∈ H[b] && !n ∈ H[e] && !e ∈ H[n])
            {
                changed = true;
                add (e->n) into DG;
                ∀ x ∈{e}∪ Hinv[e], H[x] |= {n}∪ H[n];
                ∀ x ∈{n}∪ H[n], Hinv[x] |= {e}∪ Hinv[e];
            }
        }
} while (changed);
for each node n in the super block
    for each (CSBegin, CSEnd) in the super block
        if (!n ∈ H[b] && !b ∈ H[n] && !n ∈ H[e] && !e ∈ H[n])
            DG[n] = b;
```

---

As discussed previously, the performance of a network application, designed in a multithreaded environment, can be improved if more threads can be processed simultaneously. A network system may include a network processor such as the Intel Internet eXchange Processor (IXPs) that is capable of Ethernet data processing. The network system may communicate with other systems in the network via its network interfaces and may also be referred to as fabric. A fabric receives and distributes the transmitted data from a transmitter to the fabric. Network transmissions may be wired or wireless based on network standard know in the art such as Ethernet cable, fiber optical transmissions, 802.11 standards, or satellite transmissions.

One embodiment of the invention may be implemented on a machine-readable medium. machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet The embodiments of the invention have been described in the context of network packet processing; however, it is to be understood that other computers may utilize the embodiments described herein. For example, computers such as product shipments, inventory processing, airline flights routing, may utilize the embodiments described herein.

Although the embodiments of the invention have been described in detail hereinabove, it should be appreciated that many variations and/or modifications and/or alternative embodiments of the basic inventive concepts taught herein that may appear to those skilled in the pertinent art will still fall within the spirit and scope of the invention as defined in the appended claims.

The invention claimed is:

1. A computer implemented method for rearranging a computer program comprising:
   organizing the computer program logically into a plurality of blocks;
   constructing a dependency graph based on the organization of the plurality of blocks in the computer program;
   determining a critical section included in the dependency graph;
   detecting a portion of the plurality of blocks in the computer program that could be executed outside of the critical section;
   inserting a plurality of dependency relationships based on the dependency graph between the plurality of blocks to cause execution of the detected portion of the plurality of blocks in the computer program outside of the critical section; and
   rearranging the detected portion of the plurality of blocks to outside the critical section that were inside the critical section based on the inserted plurality of dependency relationships.

2. The method of claim 1, wherein the plurality of blocks includes computer program instructions.

3. The method of claim 1 further comprising organizing the plurality of blocks in the computer program based on a node and a super block, wherein the node includes a plurality of blocks and the super block includes a plurality of nodes.

4. The method of claim 1, wherein the critical section included in the dependency graph accesses shared resources.

5. The method of claim 1 further comprising adding a termination point to the critical section if a portion of the critical section is outside of the dependency graph.

6. The method of claim 5 comprising inserting a first dependency relationship into and based on the dependency graph, between the plurality of blocks and the added termination point, to form a reconstructed dependency graph to cause execution of the added termination point prior to all other nodes in the reconstructed dependency graph.

7. The method of claim 5 comprising inserting a first dependency relationship into and based on the dependency graph, between the plurality of blocks and the added termination point, to form a reconstructed dependency graph to cause execution of the added termination point subsequent to all other nodes in the reconstructed dependency graph.

8. The method of claim 1 further comprising inserting an additional dependency relationship based on a direct dependency, an indirect dependency, or a shortest life-time dependency.

9. The method of claim 1 further comprising scheduling to execute the plurality of blocks in the computer program based on the dependency graph, after rearranging the detected portion of the plurality of blocks to outside the critical section.

10. The method of claim 1 comprising:
    assessing whether a portion of the critical section is outside of the dependency graph; and
    adding a termination point to the critical section and inside the dependency graph when the portion of the critical section is outside of the dependency graph.

11. A computer implemented system for rearranging a computer program comprising:
    a computer program organizer, to organize the computer program logically into a plurality of blocks;
    a dependency graph construction module, to construct a dependency graph based on the plurality of blocks of the computer program;
    a critical section determination module to determine a critical section included in the dependency graph;
    a detection module to detect a portion of the computer program recognized outside of the critical section that could be executed by the processor; and
    a dependency relationships inserter, to insert a dependency relationship between the plurality of blocks to cause execution of the detected portion of the computer program outside of a critical section.

12. The system of claim 11, wherein the critical section included in the dependency graph accesses shared resources.

13. The system of claim 12, wherein the dependency relationships inserter adds a termination point to the critical section blocks if a portion of the critical section is outside of the dependency graph.

14. A system for processing a plurality of network packets comprising:
    a network processor;
    a network interface to control the transmission between the network processor and a network;
    a shared resource accessible to the plurality of network packets;
    a network processor program to process the plurality of network packets;
    a dependency graph constructor to construct a dependency graph based on the network processor program, determine a critical section, and include the critical section in the dependency graph; and
    a dependency relationship inserter to (a) optimize the network processor program by inserting a plurality of dependency relationships based on the dependency graph to rearrange the order in which the network processor program is executed, and (b) insert additional dependency relationships based on an indirect dependency.

15. A non-transitory computer-readable storage medium that provides instructions that, when executed by a processor, causes the processor to:
    organize a computer program logically into a plurality of blocks;
    construct a dependency graph based on the organization of the plurality of blocks in the computer program;
    determine a critical section associated with the dependency graph;
    detect a portion of the plurality of blocks in the computer program that could be executed outside of the critical section;
    insert a plurality of dependency relationships between the plurality of blocks to cause execution of the detected portion of the plurality of blocks in the computer program outside of the critical section; and
    rearrange the detected portion of the plurality of blocks to outside the critical section that were inside the critical section based on the inserted plurality of dependency relationships.

16. The non-transitory computer-readable storage medium of claim 15, wherein the critical section included in the dependency graph accesses shared resources.

17. The non-transitory computer-readable storage medium of claim 15 further comprising instructions that add a termination point to the critical section if a portion of the critical section is outside of the computer program.

18. The machine readable medium of method 15 further comprises inserting dependency relationships based on a shortest life-time dependency.

\* \* \* \* \*